United States Patent [19]
Kuroki

[11] Patent Number: 4,617,621
[45] Date of Patent: Oct. 14, 1986

[54] INVERTERS WITH REDUCED DISTRIBUTED INDUCTANCE

[75] Inventor: Kazuo Kuroki, Tokyo, Japan

[73] Assignee: Fuji Electric Co., Ltd., Kawasaki, Japan

[21] Appl. No.: 697,779

[22] Filed: Feb. 4, 1985

[51] Int. Cl.[4] ............ H02M 7/00; H02H 7/122
[52] U.S. Cl. ........................... 363/71; 363/55; 174/34
[58] Field of Search ............. 363/50, 55–58, 363/71, 132, 135, 136; 174/33, 34

[56] References Cited

U.S. PATENT DOCUMENTS 3,260,978 7/1966 Müller .................. 174/34 X
3,792,286 2/1974 Meier .................. 363/71 X
4,128,868 12/1978 Gamble .................. 363/26

Primary Examiner—Peter S. Wong
Attorney, Agent, or Firm—Brumbaugh, Graves, Donohue & Raymond

[57] ABSTRACT

In the particular embodiments described in the specification, an inverter connected to a DC source and a load includes two or more inverter units operating on a phase basis, and three connecting wires, consisting of two wires connecting each inverter unit and the power source and one wire connecting each inverter unit and the load, are arranged close to one another or twisted together. With this arrangement the distributed inductance is reduced not only for the wires connecting the DC source and the inverter but also for the wires connecting the inverter units.

2 Claims, 7 Drawing Figures

INVERTERS WITH REDUCED DISTRIBUTED INDUCTANCE

SPECIFICATION

Background of the Invention

The present invention relates to inverters and, more particularly, to a new and improved inverter arrangement especially adapted to reduce the distributed inductance of the conductors used to connect a DC source, inverter units and other components.

When semiconductor elements are employed as switching means for inverters, the energy stored in the connecting conductors is usually applied to the semiconductor elements as a voltage spike when the power supply is switched off. Therefore, it is necessary to provide snubber circuits comprising capacitors, resistors, diodes and the like to suppress the voltage spike to a level below a maximum allowable level. If the total inductance of the connecting conductors, i.e. the distributed inductance, is large, the snubber circuit necessarily is large in size and expensive.

Heretofore, attempts have been made to reduce the distributed inductance of connecting conductors in such systems by making the conductors as short as possible and twisting an adjacent pair of conductors together but this is effective only for small capacity inverters. For large capacity inverters the presense of unpaired conductors of substantial length prevents elimination of distributed inductance in this manner. Moreover, in large capacity inverters the necessary snubber circuits are large and expensive.

Accordingly, it is an object of the present invention to provide an inverter which is compact and inexpensive by eliminating the aforementioned shortcomings.

Another object of the invention is to provide a large capacity inverter having a reduced distributed inductance, permitting a correspondingly smaller snubber circuit.

SUMMARY OF THE INVENTION

These and other objects are accomplished according to the present invention by providing two or more inverter units and arranging the conductors for connecting the separate inverter units to the supply and to the load in close proximity to each other.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1A:
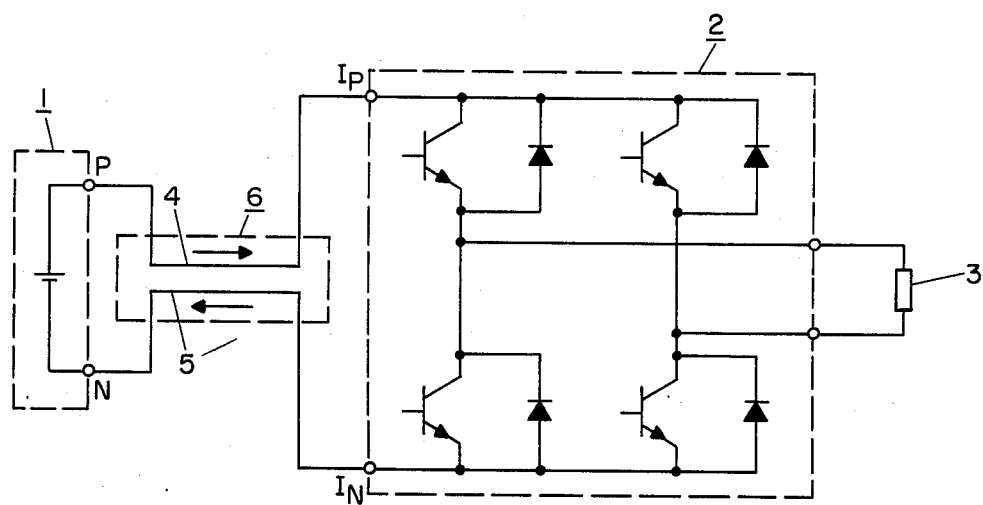
FIGS. 1A and 1B are schematic circuit diagrams showing the circuit configurations of conventional single phase bridge inverters.
Figure 1B:
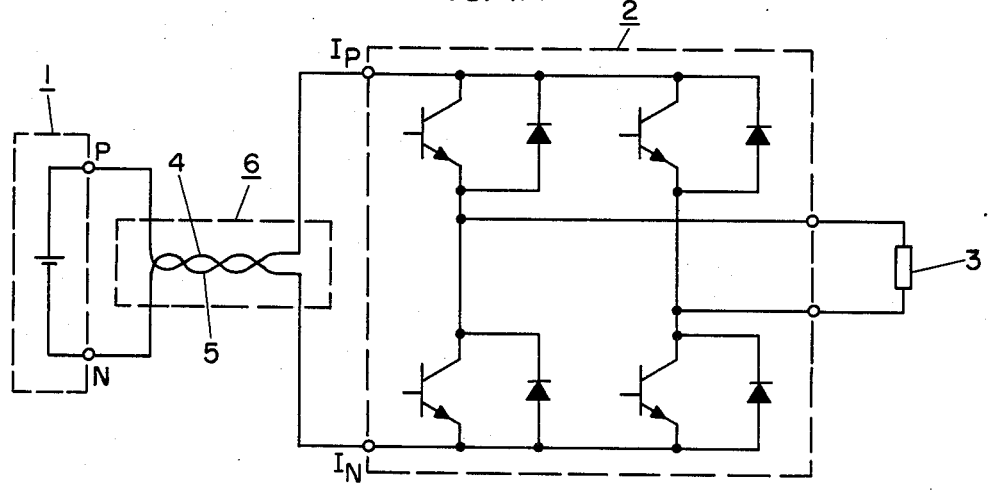

In the conventional inverter circuits shown in FIGS. 1A and 1B attempts are being made to reduce the distributed inductance by arranging the supply conductors close to each other as shown in FIG. 1A, or by twisting those conductors together as illustrated in FIG. 1B. In each of the inverters shown in FIGS. 1A and 1B a DC source 1 supplies DC current to an inverter 2 containing bridge circuits. The inverter supplies AC current to a load 3 and receives the DC current through a cable 6 consisting of a wire 4 connecting the inverter unit to one pole P of the DC source and another wire 5 connecting the unit to the other pole N of the DC source. The DC power supplied from the source 1 through the cable 6 is converted into AC power by the inverter 2 and supplied to the load 3, a transistor being used as switching means for the inverter 2.

In this configuration, since the inverter is arranged as a single unit, the distributed inductance to be eliminated is the inductance of the cable 6 connecting the DC source 1 and the inverter 2 in which current flows in opposite directions, as shown by arrows, through the wires 4 and 5.

With this arrangement, the distributed inductance in each wire offsets that in the other wire since the connecting wires 4 and 5 are positioned close to each other or twisted together as shown in FIGS. 1A and 1B, respectively, so that the total distributed inductance is reduced. In addition, the distributed inductance may be further reduced by shortening the cable 6 between the DC source and the inverter 2. These methods are effective, however, only when the inverter 2 is small in size and the influence of the distributed inductance within the apparatus is small enough to be ignored.

Figure 2:
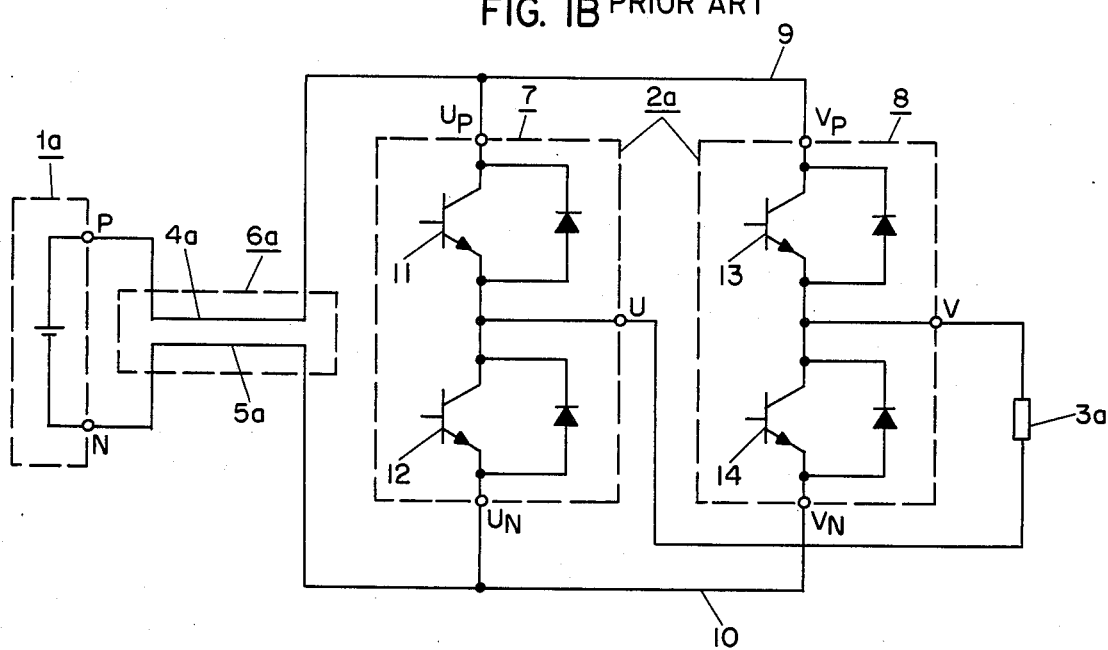
FIG. 2 is a schematic circuit diagram showing the circuit configuration of a conventional inverter of large capacity.

FIG. 2 shows a conventional inverter of large capacity comprising a DC source 1a a load 3a, and a cable 6a composed of a wire 4a leading to the terminal P of the DC source and a wire 5a leading to the terminal N of the source. This arrangement utilizes an inverter 2a composed of a combination of a U-phase inverter unit 7 and a V-phase inverter unit 8 operating on a phase basis, with two wires 9 and 10 connecting the inverter units 7 and 8 and two transistors 11 and 12, and 13 and 14, respectively, in each unit.

As shown in FIG. 2, the inverter 2a must include separate U-phase and V-phase inverter units 7 and 8 operating on a phase basis. Consequently, the inverter is necessarily larger in size. In an inverter of large capacity, since the inverter units are employed on a phase basis, the wires 9 and 10 connecting the inverter units tend to be longer and, at the same time, the distributed inductance of the wires connecting the units becomes large enough so that it can not be ignored.

In the arrangement shown in FIG. 2, when the transistors 11 and 14 are conducting and the transistors 12 and 13 are turned off, the current flows to the transistor 11 of the U-phase inverter unit 7 from the DC source through the P side connecting wire 4a. The current flowing from the transistor 11 flows to the transistor 14 of the V-phase inverter unit 8 through the load 3a and returns from the transistor 14 to the DC source 1a through the connecting wire 10 and the N side connecting wire 5a. At this time, since the currents flow through the two connecting wires 4a and 5a constituting the connecting cable 6a in opposite directions, the inductance in those wires may offset each other and the distributed inductance may be reduced by arranging the P side connecting wire 4a and the N side connecting wire 5a close to each other. With this arrangement, however, there is no way of reducing the distributed inductance for the connecting wire 10 because the current does not flow through the connecting wire 9 in a direction opposite to the current in the connecting wire 10 at the same time. This causes an increase in the distributed inductance.

Moreover, while the transistors 12 and 13 are conducting and the transistors 11 and 14 are turned off, the current flows to the transistors 13 of the V-phase inverter unit 8 from the DC source 1a through the P side connecting wire 4a and the connecting wire 9. The current then flows from the transistor 13 to the transistor 7 of the U-phase inverter unit 7 through the load 3a and returns to the DC source 1a through the N side connecting wire 5a. At this time, since the current flows through the two connecting wires 4a and 5a constituting the supply cable 6a in opposite directions, the distributed inductance may be reduced by arranging both the connecting wires 4a and 5a close to each other but the distributed inductance of the wire 9 connecting the units can not be reduced.

In such an inverter utilizing separate inverter circuits on a phase basis, a large snubber circuit must be used because of the distributed inductance of the wires 9 and 10 connecting the units. As a result, the inverter itself becomes large in size and expensive. If the wires connecting the unit are shortened, the distributed inductance may be reduced. However, this will result in further restrictions on the construction of the inverter unit with the disadvantage that not only productivity but also reliability may be reduced.

Figure 3A:
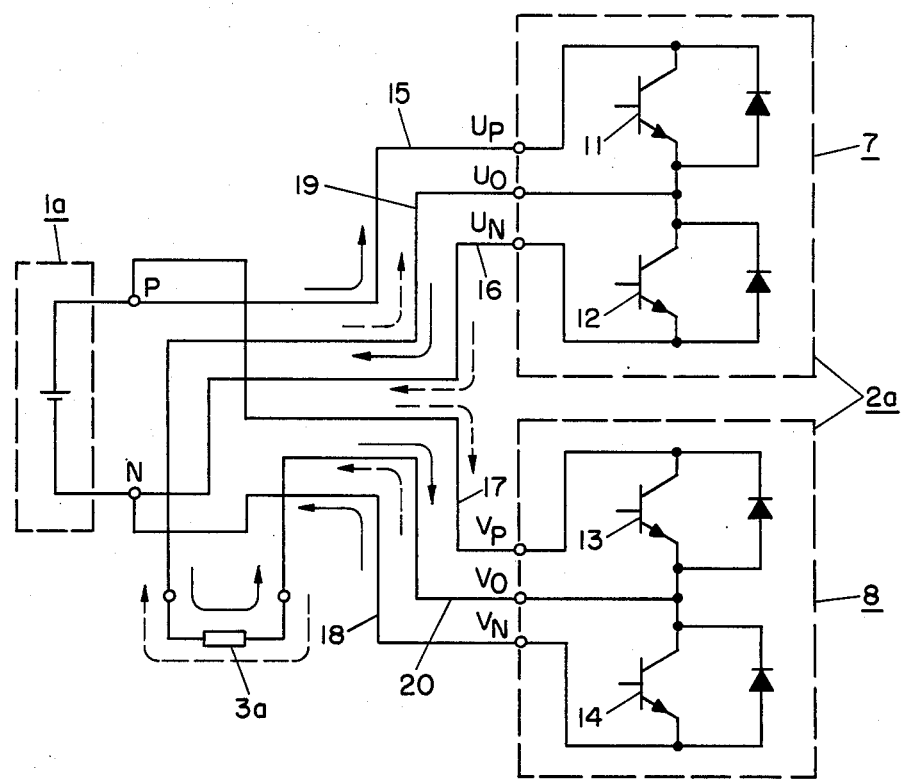
FIGS. 3A and 3B are schematic circuit diagrams illustrating the circuit configuration of a representative single-phase bridge inverter embodying the present invention.
Figure 3B:
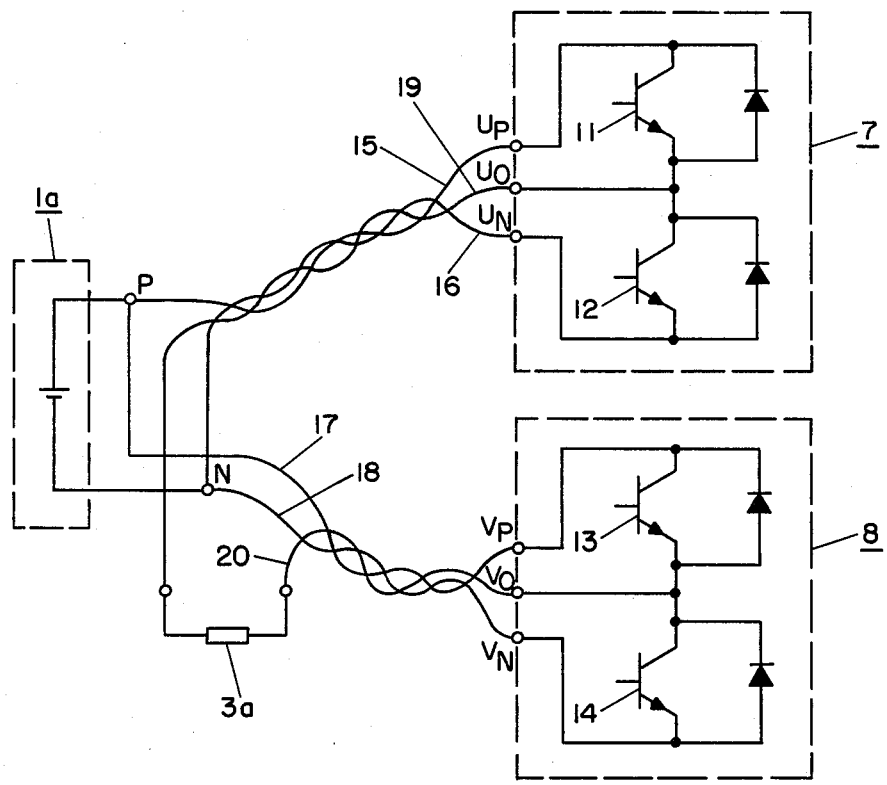

FIGS. 3A and 3B illustrate representative circuit configurations of single phase bridge inverters embodying the present invention. FIG. 3A represents a circuit configuration wherein certain wiring conductors are arranged close to one another, whereas FIG. 3B shows another arrangement wherein certain conductors are twisted together. Each of these configurations includes a DC source 1a, an inverter 2a composed of a U-phase inverter unit 7 and a V-phase inverter unit 8, and a load 3a. The inverters 7 and 8 include transistors 11 and 12, and 13 and 14, respectively. Two wires 15 and 16 connect the U-phase inverter unit to the terminals P and N, respectively, of the DC source and two wires 17 and 18 connecting the V-phase inverter unit to the terminals P and N, respectively, of the source. In addition, a wire 19 connects the U-phase inverter unit to the load and a wire 20 connects the V-phase inverter unit to the load.

As shown in FIG. 3, the output terminals P and N of the DC source 1a are connected to the U-phase inverter unit 7 and the V-phase inverter unit 8, respectively. The load 3a is connected between the wire 19 leading to the U-phase inverter unit 7 and the wire 20 leading to the V-phase inverter unit. The DC source 1a and the U-phase inverter unit 7 are therefore connected together by the three wires 15, 19 and 16. These wires are arranged close to one another in the arrangement shown in FIG. 3A and are twisted together in the embodiment of FIG. 3B. The wire 19 connecting the U-phase inverter unit and the load is adjacent to the wires 15 and 16 connecting the U-phase unit to the supply so as to be electromagnetically coupled to these wires and the end connected to the load 3a is as close as possible to the DC source 1a. A similar wiring arrangement of the wires 17, 20 and 18 is made for the V-phase inverter unit 8.

When the transistors 11 and 14 are conducting and the transistors 12 and 13 are turned off in the above-described circuit configuration, the current flows to the transistor 11 of the U-phase inverter unit 7, from the DC source 1a through the wire 15 connecting the U-phase inverter unit and the terminal P of the supply, as shown by a solid line arrow. The current then flows from the transistor 11 to the load 3a through the wire 19 connecting the U-phase inverter unit and the load and then to the transistor 14 of the V-phase inverter unit 8 from the load 3a through the wire 30 connecting the V-phase inverter unit and the load. The current then flows from the transistor 14 to the DC source 1a through the wire 18 connecting the V-phase inverter unit and the terminal N of the source.

In operation, the currents flowing through the wires 15 and 19 connecting the U-phase inverter unit to the terminal P of the supply and the load, respectively, have the same value and flow in the opposite direction while the currents flowing through the wires 18 and 20 connecting the V-phase inverter unit to the terminal N of the supply and the load, respectively, have the same value and flow in opposite directions. Since the wires connecting each phase inverter unit to the supply and the load are positioned close to each other, the distributed inductances of those wires offset each other and the total distributed inductance is reduced.

Similarly, when the transistors 12 and 13 are conducting and the transistors 11 and 14 are turned off, the current flows to the transistor 13 of the V-phase inverter unit from the DC source 1a through the wire 17 connecting the V-phase inverter unit and the terminal P of the source, as shown by a dotted line arrow. The current from the transistor 13 flows to the load 3a through the wire 20 connecting the V-phase inverter unit and the load and then flows to the transistor 12 of the U-phase inverter unit 7 from the load 3a through the wire 19 connecting the U-phase inverter unit and the load. The current from the transistor 12 returns to the DC source 1a through the wire 16 connecting the U-phase inverter unit and the source.

During this phase of the operation the currents flowing through the wires 17 and 20 connecting the V-phase inverter unit to the supply and the load, respectively, and the currents flowing through the wires 16 and 19 connecting the U-phase inverter unit to the supply and the load, respectively, have the same value and flow in opposite directions in each set of wires. Accordingly, the distributed inductances of the wires connecting each phase inverter unit to the source and the load offset each other and the total distributed inductance is reduced.

If the wires respectively connecting each unit to the supply and the load are twisted together, as shown in FIG. 3B, the electromagnetic coupling of the wires will be more complete and the distributed inductance of the adjacent wires will be more effectively cancelled, so that the total distributed inductance may be made extremely small.

Figure 4A:
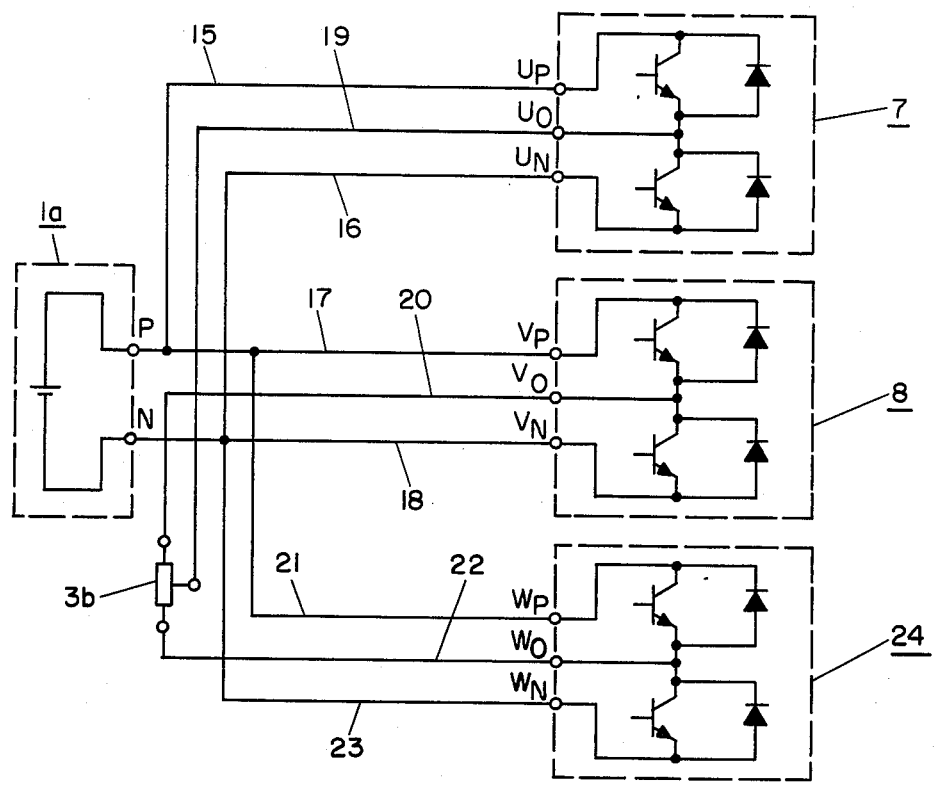
FIGS. 4A and 4B are schematic diagrams showing the configurations of typical three-phase bridge inverters embodying the present invention.
Figure 4B:
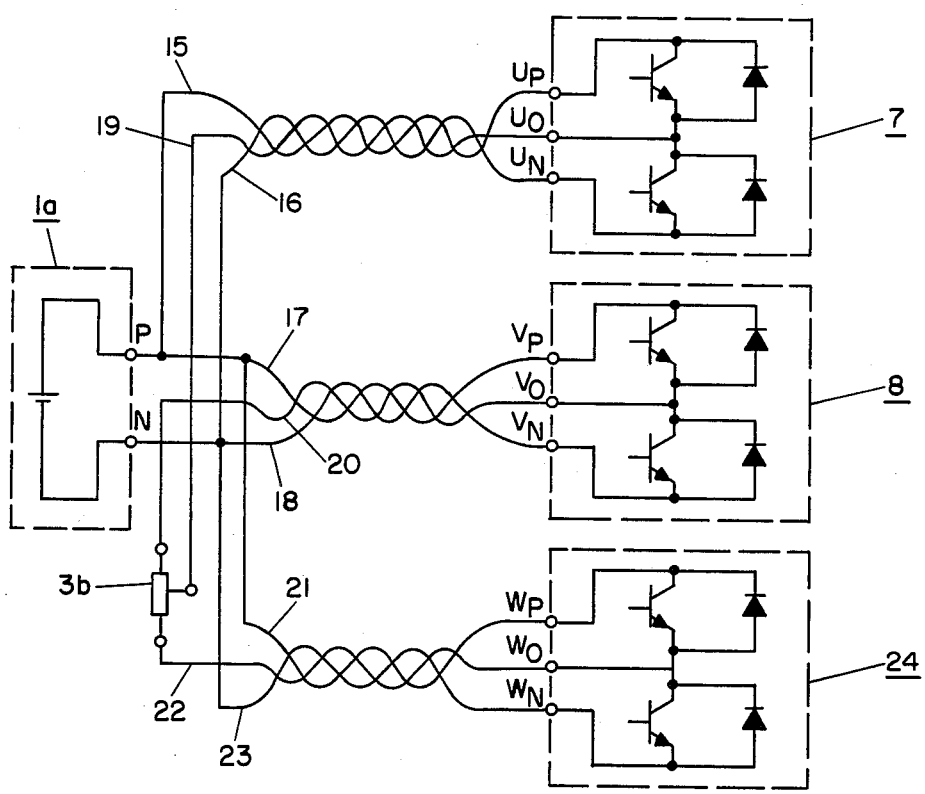

FIGS. 4A and 4B show typical circuit configurations in which the present invention is applied to typical three-phase bridge inverters. FIG. 4A illustrates an arrangement in which the connecting wires are positioned close to one another, whereas in FIG. 4B they are twisted together. Both of these embodiments include a DC source 1a an inverter comprising a U-phase inverter unit 7 and a V-phase inveter unit 8, a W-phase inverter unit 24, and a load 3a. A wire 21 connects the W-phase inverter unit and the terminal P of the supply and a wire connects the W-phase inverter unit and the load, while a wire 23 connects the W-phase inverter unit and the terminal N of the supply. The remainder of the circuit is the same as those of FIGS. 3A and 3B.

In a three-phase inverter like this, the same action as that of the single-phase inverter of FIGS. 3A and 3B is produced. Because of the close positioning of the wires connecting each phase inverter unit to the supply and the load with current flowing in opposite directions, the distributed inductance is offset. As a result, the total distributed inductance is considerably reduced.

I claim:

1. An inverter comprising DC power source means, load means, a plurality of inverter units arranged to operate on a phase basis, first conductor means including a pair of conductors for connecting each phase inverter unit to the power source means, and second conductor means including a conductor for connecting each phase inverter unit to the load means, wherein the conductors of the first and second conductor means for each inverter unit are arranged in close proximity from the inverter unit to a location adjacent to the power source means or the load means.

2. An inverter according to claim 1 wherein the conductors of the first and second conductor means which connect each phase inverter unit to the power source means and the load means are twisted together.